(12) United States Patent
Tsuchiya et al.

(10) Patent No.: US 6,489,015 B1
(45) Date of Patent: Dec. 3, 2002

(54) HARDCOAT FILM AND ANTIREFLECTION FILM

(75) Inventors: Mitsuru Tsuchiya, Tokyo-To (JP); Amane Koike, Tokyo-To (JP); Takahiro Niimi, Tokyo-To (JP)

(73) Assignee: Dai Nippon Printing Co., Ltd. (JP)

( * ) Notice: Subject to any disclaimer, the term of this patent is extended or adjusted under 35 U.S.C. 154(b) by 0 days.

(21) Appl. No.: 09/440,128

(22) Filed: Nov. 15, 1999

(30) Foreign Application Priority Data

Nov. 17, 1998 (JP) ............................................. 10-327151

(51) Int. Cl.$^7$ ............................... B32B 5/14; B32B 5/16
(52) U.S. Cl. ........................ 428/212; 428/217; 428/218; 428/323; 428/328; 428/330
(58) Field of Search ................................ 428/212, 213, 428/328, 216–20, 332, 323, 330; 235/406; 156/241

(56) References Cited

U.S. PATENT DOCUMENTS

| | | | |
|---|---|---|---|
| 5,051,298 A | 9/1991 | Landry et al. ............... | 428/220 |
| 5,508,092 A | 4/1996 | Kimock et al. .............. | 428/216 |
| 5,637,353 A | 6/1997 | Kimock et al. .......... | 427/255.3 |
| 5,747,152 A * | 5/1998 | Oka et al. .................... | 428/323 |
| 5,756,178 A | 5/1998 | Obadia ...................... | 428/66.4 |
| 5,770,306 A | 6/1998 | Suzuki et al. ................ | 428/328 |
| 5,844,225 A | 12/1998 | Kimock et al. ............. | 235/462 |
| 5,976,297 A | 11/1999 | Oka et al. .................... | 156/241 |
| 6,033,743 A | 3/2000 | Suzuki et al. ................. | 428/11 |
| 6,146,753 A | 11/2000 | Niimi et al. ................. | 428/332 |

FOREIGN PATENT DOCUMENTS

| | | | | |
|---|---|---|---|---|
| EP | 1040914 A1 | 11/1998 | .......... | B32B/27/36 |
| WO | WO-0074935 A1 | 12/2000 | .......... | B32B/27/06 |

* cited by examiner

*Primary Examiner*—Cynthia H. Kelly
*Assistant Examiner*—Kimberly T. Nguyen
(74) *Attorney, Agent, or Firm*—Parkhurst & Wendel, L.L.P.

(57) ABSTRACT

A hardcoat film is provided which can improve surface hardness and, at the same time, can prevent the hardcoat film per se from being damaged by stress concentration and is less likely to be scratched. The hardcoat film comprises: a transparent substrate; and a multi-layer hardcoat provided on at least one side of the transparent substrate, the multi-layer hardcoat layer comprising two or more hardcoats, the modulus of elasticity σm of a hardcoat provided closest to the transparent substrate being higher than the modulus of elasticity σs of a hardcoat provided as a surface layer.

14 Claims, 2 Drawing Sheets

HARDCOAT FILM AND ANTIREFLECTION FILM

TECHNICAL FIELD

The present invention relates to a transparent hardcoat film having high hardness and an antireflection film, and more particularly to a hardcoat film and an antireflection film which, in use, are laminated onto the surface of displays, such as CRT, LCD, and PDP.

PRIOR ART

In recent years, plastic products are being substituted for glass products from the viewpoints of fabricability and weight reduction. Since, however, the surface of the plastic products is likely to be scratched, in use, a hardcoat film is in many cases laminated onto the plastic products to impart scratch resistance thereto. Also in the case of the conventional glass products, there is a growing tendency for a plastic film to be laminated thereonto to prevent glass pieces from being scattered upon breaking of the glass products. Since, however, the hardness of the plastic is unsatisfactory, a hardcoat is in most cases formed on the surface of the plastic films.

Further, in recent years, displays, such as CRT and LCD, have been widely spread, and there is an ever-increasing tendency for a hardcoat film to be laminated onto the displays to protect the surface of display images. For the same reason as described above, an increase in hardness is required, and, at the same time, good visibility of the display screen per se through the hardcoat film is required. A known method for forming a hardcoat to eliminate the disadvantage of the surface hardness is to coat a thermosetting resin or an ionizing radiation-curable resin, such as an ultraviolet-curable resin, onto a base substrate followed by curing to form one layer of an about 3 to 10 $\mu$m-thick coating.

In this coating thickness, however, the coating is likely to be influenced by the deformation of the base substrate, and thus, the film strength is not satisfactorily high. Increasing the modulus of elasticity of the hardcoat is effective in suppressing the deformation of the substrate. In this case, however, the hardcoat is likely to be cracked, and, in addition, curling is increased due to cure shrinkage of the hardcoat. At the same time, due to stress concentration on the surface of the hardcoat, stress strain is likely to cause cracking and consequently is likely to cause a scratch on the surface of the film. Although the hardness can be increased simply by increasing the thickness of the hardcoat, this cannot prevent cracking or separation and curling of the hardcoat.

In order to solve these problems, Japanese Patent Laid-Open Publication Nos. 93545/1992 and 8350/1993 have proposed a method wherein a multi-layer hardcoat of two hardcoats is formed in such a manner that the hardcoat provided on the surface layer side has higher hardness (higher modulus of elasticity) than the hardcoat provided on the substrate side to improve the surface hardness of the hardcoat film. Higher modulus of elasticity in the hardcoat on the surface layer side can certainly prevent the hardcoat from being scratched by materials having relatively low hardness, such as pencils, and, hence, can provide an effect associated with improved hardness.

However, against materials, which as such have high hardness, such as the tip of a mechanical pencil or a diamond needle, excessively high modulus of elasticity of the hardcoat causes stress concentration on the surface of the hardcoat. This is likely to cause a scratch on the surface thereof. In the case of a hardcoat film wherein an antireflection layer (AR layer) has been formed by vapor deposition or sputtering onto the multi-layer hardcoat having the above layer construction, this tendency is significant, and stress concentration on the AR layer to cause damage is remarkable and visually observed.

DISCLOSURE OF THE INVENTION

Accordingly, it is an object of the present invention to provide a hardcoat film comprising a substrate having thereon two or more hardcoats, which hardcoat film has improved surface hardness, does not undergo stress concentration-induced damage, and is less likely to be scratched.

In order to attain the above object of the present invention, according to one aspect of the present invention, there is provided a hardcoat film comprising: a transparent substrate; and a multi-layer hardcoat layer provided on at least one side of the transparent substrate, the multi-layer hardcoat layer comprising two or more hardcoats, the modulus of elasticity $\sigma m$ of a hardcoat provided closest to the transparent substrate being higher than the modulus of elasticity $\sigma s$ of a hardcoat provided as a surface layer. As used herein, the "hardcoat provided as a surface layer" refers to at least one layer of the hardcoats other than the hardcoat provided closest to the transparent substrate.

In preferred embodiments, the present invention provides a hardcoat film wherein the modulus of elasticity $\sigma m$ of the hardcoat provided closest to the transparent substrate and the modulus of elasticity $\sigma s$ of the hardcoat provided as the surface layer satisfy a requirement represented by formula $3 > \sigma m - \sigma s > 0$, a hardcoat film wherein the modulus of elasticity of the hardcoat provided closest to the transparent substrate is not less than 8 mN/$\mu$m and not more than 13 mN/$\mu$m and the modulus of elasticity of the hardcoat provided as the surface layer is not less than 6 mN/$\mu$m and not more than 9 mN/$\mu$m, and a hardcoat film wherein the modulus of elasticity $\sigma h$ of the hardcoat film and the modulus of elasticity $\sigma s$ of the hardcoat provided as the surface layer satisfy a requirement represented by formula $2 \geq \sigma h - \sigma s \geq 0$.

Further, in preferred embodiments, the present invention provides a hardcoat film which has a surface hardness of 4H or higher in terms of pencil hardness and a scratch hardness of not less than 150 g, a hardcoat film wherein at least the hardcoat provided closest to the transparent substrate contains 20 to 80% by mass of inorganic fine particles, and a hardcoat film wherein the content of the inorganic fine particles in at least the hardcoat provided closest to the transparent substrate is higher than the content of the inorganic fine particles in the hardcoat as the surface layer.

Furthermore, in preferred embodiments, the present invention provides a hardcoat film wherein the inorganic fine particles are ultrafine particles of silica having a particle diameter of not more than 100 nm, a hardcoat film wherein the multi-layer hardcoat layer has been formed from a material composed mainly of an ionizing radiation-curable resin, a hardcoat film wherein the total thickness of the hardcoats is 10 to 50 $\mu$m, a hardcoat film wherein the transparent substrate has a surface hardness of not more than HB in terms of pencil hardness, and a hardcoat film wherein the transparent substrate is a polyethylene terephthalate (hereinafter referred to simply as "PET") film having a thickness of 100 to 300 $\mu$m.

According to another aspect of the present invention, there is provided an antireflection film comprising an antireflection layer provided on the multi-layer hardcoat layer in the above hardcoat film. In preferred embodiments, the present invention provides an antireflection film wherein the antireflection layer has a multi-layer structure of two or more layers formed by sputtering or vapor deposition, and an antireflection film wherein the antireflection layer in contact with the multi-layer hardcoat layer is formed of ultrafine particles of a metal oxide.

BEST MODE FOR CARRYING OUT THE INVENTION

The present invention will be described in more detail with reference to the following preferred embodiments.

Figure 1:
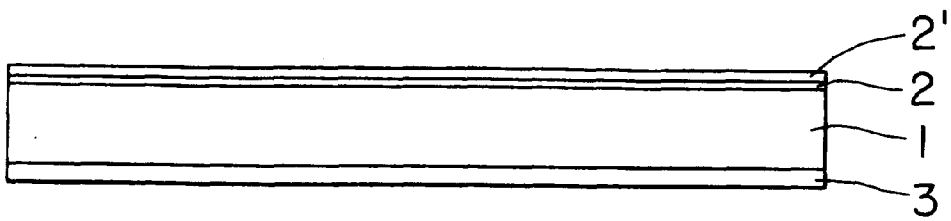
FIG. 1 is a cross-sectional view showing a basic layer construction of the hardcoat film according to the present invention.

FIG. 1 shows a basic layer construction of the hardcoat film according to the present invention. In FIG. 1, numeral 1 designates a transparent substrate, and numerals 2, 2' respectively designate hardcoats which have been formed using dissimilar hardcoat-forming materials and constitute a multi-layer hardcoat of two layers.

In this embodiment, the multi-layer hardcoat layer is composed of two layers (2, 2'). The multi-layer hardcoat layer, however, may comprise three or more layers so far as the total thickness of the hardcoats, that is, the thickness of the whole multi-layer hardcoat layer, is 10 to 50 $\mu$m. The multi-layer hardcoat layer comprising two or more hardcoats can disperse externally applied stresses, such as bending or impact, and thus can further reduce the problems of cracking or separation involved in a thick hardcoat and the problem of curling.

Specifically, a hardcoat film having an excellent hardness of not less than 4H in terms of pencil hardness while preventing cracking or separation of the hardcoat and curling could be realized by adopting a construction such that hardcoats 2, 2' (total thickness of the hardcoats: 10 to 50 $\mu$m) are provided on the transparent substrate 1 in such a manner that one of the hardcoats, the hardcoat 2, contains 20 to 80% by mass of inorganic fine particles and, in addition, the modulus of elasticity of the hardcoat 2 is made higher than that of the hardcoat 2'.

In this connection, in the hardcoat film of the present invention, excellent properties characteristic of the present invention can be provided by making the modulus of elasticity $\sigma m$ of the hardcoat provided closest to the transparent substrate higher than the modulus of elasticity $\sigma s$ of the hardcoat as the surface layer. Further, the modulus of elasticity $\mu m$ of the hardcoat provided closest to the transparent substrate and the modulus of elasticity $\sigma s$ of the hardcoat provided as the surface layer preferably satisfy a requirement represented by formula 3>$\sigma m-\sigma s$>0, most preferably formula 3>$\sigma m-\sigma s$>1.

The modulus of elasticity of the hardcoat provided closest to the transparent substrate is preferably not less than 8 mN/$\mu$m and not more than 13 mN/$\mu$m, more preferably not less than 8 mN/$\mu$m and not more than 12 mN/$\mu$m, most preferably not less than 8 mN/$\mu$m and not more than 10 mN/$\mu$m. The modulus of elasticity of the hardcoat as the surface layer is preferably not less than 6 mN/$\mu$m and not more than 9 mN/$\mu$mg, more preferably not less than 6.5mN/$\mu$m and not more than 9mN/$\mu$m, most preferably not less than 7 mN/$\mu$m and not more than 8.5 mN/$\mu$m. The modulus of elasticity $\mu h$ of the hardcoat film and the modulus of elasticity $\mu s$ of the hardcoat provided as the surface layer preferably satisfy a requirement represented by formula 2≧$\sigma h-\sigma s$≧0, more preferably formula 1>$\sigma h-\sigma s$≧0, most preferably formula 1>$\sigma h-\sigma s$>0.

Figure 2:
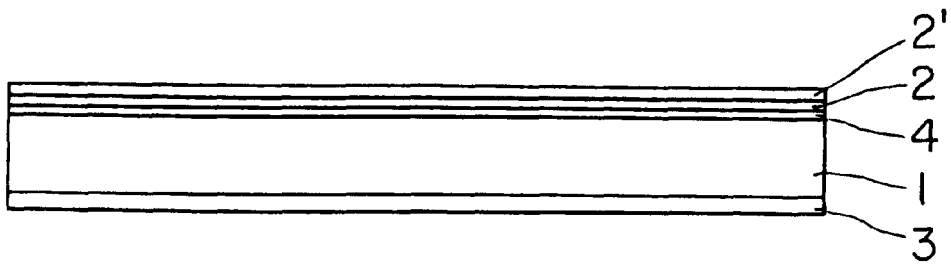
FIG. 2 is a cross-sectional view showing a construction wherein a primer layer has been added to the layer construction shown in FIG. 1.

In the hardcoat film according to the present invention, in order to apply the hardcoat film to an object, an adhesive layer 3 formed of a conventional adhesive may be provided on the transparent substrate 1 in its surface remote from the hardcoat layers 2, 2'. Further, as shown in FIG. 2, an about 0.1 to 3 $\mu$m-thick primer layer 4 formed of a conventional primer material may be provided between the hardcoat 2 and the transparent substrate 1 in order to improve the adhesion between the hardcoat and the substrate.

Figure 3:
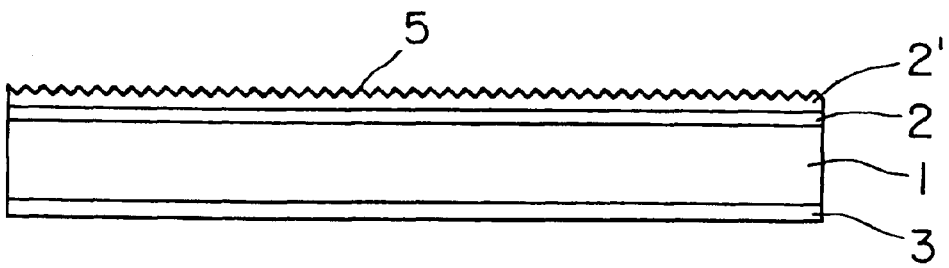
FIG. 3 is a cross-sectional view showing the construction of a hardcoat film to which antiglare properties have been imparted.
Figure 4:
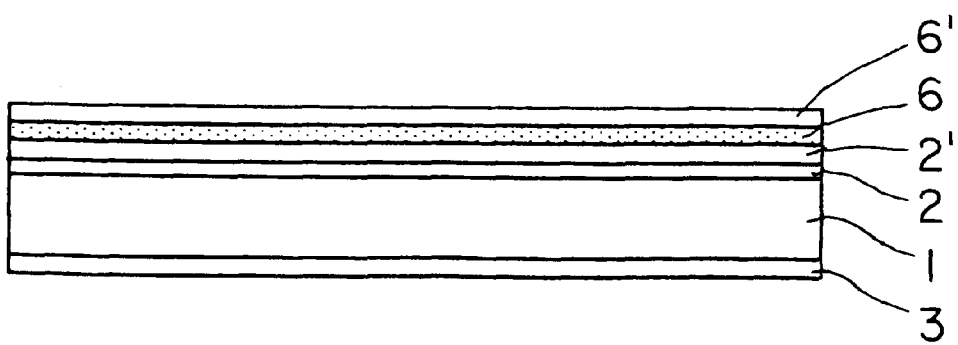
FIG. 4 is a cross-sectional view showing a construction wherein an antireflection layer has been provided on the hardcoat shown in FIG. 1.

FIG. 3 shows the layer construction of another embodiment of the hardcoat film according to the present invention, wherein the surface of the hardcoat 2' has concaves and convexes 5 which can impart antiglare properties to the hardcoat film. FIG. 4 shows the layer construction of the hardcoat film according to a further embodiment of the present invention, wherein at least two antireflection layers 6, 6' are additionally provided on the hardcoat 2' in the hardcoat film shown in FIG. 1 to impart an antireflective effect to the hardcoat film. This layer construction constitutes an embodiment of the antireflective hardcoat film (antireflection film).

Any transparent substrate may be used in the present invention. However, the transparent substrate preferably has a pencil hardness of not more than HB, more preferably not less than 4B and not more than HB. Preferred transparent substrates of this type include, for example, PET films. When the surface of an object, onto which the hardcoat film is applied, should be seen through the hardcoat film, a PET film having a thickness of 100 to 300 $\mu$m is suitable as the transparent substrate.

According to the present invention, the total thickness of the hardcoats is 10 to 50 $\mu$m, preferably 15 to 50 $\mu$m. When the total thickness is less than 10 $\mu$m, the effect of suppressing the deformation of the transparent substrate by the hardcoat is small and, in addition, the hardness is unsatisfactory. On the other hand, when the total thickness exceeds 50 $\mu$m, cracking or separation of the hardcoat and curling unfavorably occur.

Hardcoat-forming materials usable herein include ionizing radiation-curable resins, thermosetting resins, thermoplastic resins, and engineering plastics. Among them, ionizing radiation-curable resins are preferred because a coating can be easily formed on the transparent substrate and, at the same time, the pencil hardness can be easily increased to a desired value.

Examples of ionizing radiation-curable resins usable in the formation of the hardcoat are as follows. Preferred are ionizing radiation-curable resins having an acrylate functional group, and more preferred are polyester acrylate and urethane acrylate. The polyester acrylate comprises an acrylate or methacrylate (in the present specification, acrylate and/or methacrylate being referred to as "(meth)acrylate") of an oligomer of a polyester polyol or a mixture of the (meth)acrylates of the oligomers. The urethane (meth) acrylate is a (meth)acrylation product of an oligomer composed of a polyol compound and a diisocyanate compound.

Monomers for constituting (meth)acrylate include methyl (meth)acrylate, ethyl (meth)acrylate, butyl (meth)acrylate, 2-ethylhexyl (meth)acrylate, methoxyethyl (meth)acrylate, butoxyethyl (meth)acrylate, and phenyl (meth)acrylate.

When hardness is further imparted to the coating, a polyfunctional monomer may be used in combination with the material. Examples of polyfunctional monomers usable herein include trimethylolpropane tri(meth)acrylate, hexanediol (meth)acrylate, tripropylene glycol di(meth) acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth) acrylate.

Polyester oligomers include polyadipate polyols or polysebacate polyols which are condensates of adipic acid with glycols (such as ethylene glycol, polyethylene glycol, propylene glycol, polypropylene glycol, butylene glycol, or polybutylene glycol) or triols (such as glycerin or trimethylolpropane) or condensates of sebacic acid with glycols or triols. The aliphatic dicarboxylic acid may be partially or entirely substituted by other organic acid. For example, isophthalic acid, terephthalic acid, phthalic anhydride or the like may be used as a constituent for imparting better hardness to the hardcoat.

The urethane oligomer may be obtained from an adduct of a polyisocyanate with a polyol. For example, the urethane oligomer may be prepared by reacting a compound, selected from methylene-bis(p-phenylene diisocyanate), hexamethylene diisocyanate/hexanetriol adduct, hexamethylene diisocyanate, tolylene diisocyanate, tolylene diisocyanate/trimethylolpropane adduct, 1,5-naphthylene diisocyanate, thiopropyl diisocyanate, ethylbenzene 2,4-diisocyanate, dimer of 2,4-tolylene diisocyanate, hydrogenated xylylene diisocyanate, tris(4-phenylisocyanate) thiophosphate and the like, with the following polyol.

Examples of polyols usable herein include: polyether polyols, such as polyoxytetramethylene glycol; polyester polyols, such as polyadipate polyol and polycarbonate polyol; and copolymers of (meth)acrylic esters with hydroxyethyl (meth)acrylate.

When the ionizing radiation-curable resin is used as an ultraviolet-curable resin, this resin is mixed with a photopolymerization initiator, such as an acetophenone compound, a benzophenone compound, a Michler's benzoyl benzoate, an α-amyloxime ester, or a thioxanthone compound and/or a photosensitizer, such as n-butylamine, triethylamine, or tri-n-butylphosphine.

The urethane (meth)acrylate has high elasticity and flexibility and excellent workability (bendability). However, on the other hand, the surface hardness is unsatisfactory, and a pencil hardness of not less than 2H cannot be provided. On the other hand, the polyester (meth)acrylate can impart hardness by selecting the constituents of the polyester. When a flexible hardcoat film is desired, compounding of 60 to 90 parts by mass of urethane (meth)acrylate with 40 to 10 parts by mass of polyester (meth)acrylate can provide a hardcoat film having both high hardness and high flexibility.

20 to 80% by mass of inorganic fine particles having a diameter of not more than 100 nm is added to a coating liquid for forming the hardcoat 2. The addition of the inorganic particles can improve the modulus of elasticity of the hardcoat and, when the thickness of the hardcoat is increased, can relax the stress at the time of curing of the hardcoat-forming material. When the content of the inorganic fine particles is less than 20% by mass, the effect of preventing cracking, the effect of preventing separation, and the effect of preventing curling are unsatisfactory. On the other hand, when the content of the inorganic fine particles exceeds 80% by mass, the transparency of the hardcoat film is lowered. Further, in this case, the flexibility of the hardcoat is lowered, and, as with the above case, the effect of preventing cracking and the effect of preventing separation are unsatisfactory. In the formation of the hardcoat 2' as the surface layer, the inorganic fine particles may be incorporated or may not be incorporated. When the inorganic fine particles are incorporated, the content of the inorganic fine particles is preferably lower than the content of the inorganic fine particles in the hardcoat 2.

Inorganic fine particles usable herein include silica, magnesium carbonate, aluminum hydroxide, and barium sulfate. The diameter of the inorganic fine particles is preferably not more than 100 nm, more preferably 1 to 100 nm, most preferably 5 to 30 nm. The inorganic fine particles are particularly preferably ultrafine particles of silica. Surface treatment of the inorganic fine particles with a silane coupling agent or the like is preferred because this treatment can improve the dispersion of the inorganic fine particles in the hardcoat-forming material and can improve the transparency and strength of the hardcoat film. The hardcoats 2, 2' may be formed by any conventional method depending upon the properties of the coating composition or the coverage, such as roll coating, gravure coating, bar coating, or extrusion coating. The coating may be carried out a plurality of times to a total coverage of 10 to 50 μm on a dry basis.

According to the present invention, a multi-layer hardcoat layer of two or more layers is formed using the above materials. As shown in FIG. 1, the hardcoat 2 and the hardcoat 2' are formed respectively from dissimilar materials. For the dissimilar materials, even though the resins used belong to the same resin system, for example, even though the resins are acrylate materials, these materials are regarded as dissimilar hardcoat-forming materials when they are different in each other in acryl equivalent (average molecular weight/average number of moles of acryl group per molecule). Further, even though the resin materials are identical to each other, they are regarded as dissimilar hardcoat-forming materials when they are different from each other in additives.

Although the thickness of the hardcoat 2 is not particularly limited, the thickness is important for suppressing the deformation of the transparent substrate and is preferably 5 to 45 μm. Therefore, the thickness of the hardcoat 2' is preferably 45to 5 μm. The hardcoat 2' also may contain inorganic fine particles. In this case, the upper limit of the content of the inorganic fine particles in the hardcoat 2' is less than 80% by mass and is lower than the content of the inorganic fine particles in the hardcoat 2. When the content of the inorganic fine particles in the hardcoat 2' is higher than the content of the inorganic fine particles in the hardcoat 2, the modulus of elasticity is so high that, disadvantageously, the surface sometimes becomes brittle.

The modulus of elasticity of the hardcoat 2 and the modulus of elasticity of the hardcoat 2' may be varied depending upon materials for these layers, crosslinking density and the like. The crosslinking density of the hardcoat 2 is preferably higher than that of the hardcoat 2' as the surface layer. For example, when the hardcoat-forming material is an ionizing radiation-curable acrylic ester monomer or oligomer, the crosslinking density may be achieved by using a material having a lower acryl equivalent for the formation of the hardcoat 2 and using a material having a higher acryl equivalent for the formation of the hardcoat 2'.

According to the present invention, the provision of an antireflection layer on the hardcoat 2' in the hardcoat film thus obtained provides the antireflection film according to the present invention. As shown in FIG. 4, the antireflection layer may have a multi-layer structure of two (6, 6') or more layers. For example, in the case of a two-layer structure, excellent antireflection effect can be provided when the layer 6 in contact with the hardcoat is formed of ultrafine particles of a metal oxide having a higher refractive index while the layer 6' on the surface layer side is formed of a material having a lower refractive index.

The following various embodiments are possible for the antireflection layer. According to the present invention, any construction may be used so far as two or more layer may be constructed by these methods.

(1) A method wherein an about 0.1 $\mu$m-thick very thin layer of $MgF_2$ or the like is formed as the antireflection layer.

(2) A method wherein a metal layer is deposited as an antireflection layer.

(3) A method wherein a low refractive layer of a material having a lower light refractive index than the hardcoat is provided as an antireflection layer.

(4) A method wherein a high refractive layer is provided so as to contact the hardcoat, and a low refractive layer is provided on the high refractive layer. In this case, the high refractive layer and the low refractive layer constitute an antireflection layer. For example, an ultrafine particle layer of a metal oxide having a high refractive index may be unevenly distributed in the antireflection layer in its region in contact with the hardcoat 2'.

(5) A method wherein the layer construction in (4) is repeatedly stacked to form an antireflection layer.

(6) A method wherein an intermediate refractive layer, a high refractive layer, and a low refractive layer are provided in that order to form an antireflection layer.

EXAMPLES

The present invention will be described in more detail with reference to the following examples and comparative examples.

Example 1

A 188 $\mu$m-thick easy-adhesion type PET film [U-42 (tradename), manufactured by Toray Industries, Inc.] was provided as a transparent substrate. An ionizing radiation-curable resin (KZ 7992, manufactured by JSR; modulus of elasticity of a 14 $\mu$m-thick cured layer formed from the ionizing radiation-curable resin on the 188 $\mu$m-thick easy-adhesion type PET film=9.2 mN/$\mu$m) was then coated onto the PET film to a thickness of about 6 $\mu$m on a dry basis. The coating was then irradiated with ultraviolet light at 120 mJ/cm$^2$ emitted from Fusion H Bulb to cure the coating, thereby forming a hardcoat 2.

Next, an ionizing radiation-curable resin (EH 65, manufactured by The Inctec Inc.; modulus of elasticity of a 14 $\mu$m-thick cured layer formed from the ionizing radiation-curable resin on the 188 $\mu$m-thick easy-adhesion type PET film=7.8 mN/$\mu$m) was then coated onto the hardcoat 2 to a thickness of about 8 $\mu$m on a dry basis. The coating was then cured by electron beam irradiation under conditions of acceleration voltage 175 kV and exposure 10 Mrad to form a hardcoat 2'. Thus, a hardcoat film of the present invention was prepared.

Example 2

A 188 $\mu$m-thick easy-adhesion type PET film [U-42 (tradename), manufactured by Toray Industries, Inc.] was provided as a transparent substrate. An ionizing radiation-curable resin containing about 40% by mass of surface-treated ultrafine particles of silica having a diameter of 10 to 50 nm (KZ 7992, manufactured by JSR; modulus of elasticity of a 14 $\mu$m-thick cured layer formed from the ionizing radiation-curable resin on the 188 $\mu$m-thick easy-adhesion type PET film=11.5 mN/$\mu$m) was then coated onto the PET film to a thickness of about 6 $\mu$m on a dry basis. The coating was then irradiated with ultraviolet light at 120 mJ/cm$^2$ emitted from Fusion H Bulb to cure the coating, thereby forming a hardcoat 2.

Next, an ionizing radiation-curable resin (EH 65, manufactured by The Inctec Inc.; modulus of elasticity of a 14 $\mu$m-thick cured layer formed from the ionizing radiation-curable resin on the 188 $\mu$m-thick easy-adhesion type PET film=7.8 mN/$\mu$m) was then coated onto the hardcoat 2 to a thickness of about 8 $\mu$m on a dry basis. The coating was then cured by electron beam irradiation under conditions of acceleration voltage 175 kV and exposure 10 Mrad to form a hardcoat 2'. Thus, a hardcoat film of the present invention was prepared.

Example 3

A hardcoat film of the present invention was prepared in the same manner as in Example 2, except that the thickness of the hardcoat 2' was changed to about 12 $\mu$m on a dry basis.

Example 4

27 nm-thick ITO, 24 nm-thick $SiO_2$, 75 nm-thick ITO, and 92 nm-thick $SiO_2$ were sputtered onto the hardcoat 2' in the hardcoat film prepared in Example 2 to form an antireflection layer. Thus, an antireflection film of the present invention was prepared.

Example 5

A coating liquid No. 1275 for fine particles of $ZrO_2$ (a coating liquid composed of 15 parts by mass of fine particles of $ZrO_2$ and 3 parts by mass of a binder, manufactured by Sumitomo Osaka Cement Co., Ltd.) was coated on one side of a 50 $\mu$m-thick PET film [MC-19 (tradename), manufactured by REIKO CO., LTD.], the surface of which had been treated with an acrylmelamine resin, to a thickness of 57 nm on a dry basis. Next, in order to form a hardcoat 2' as a surface layer, an ionizing radiation-curable resin (EH 65, manufactured by The Inctec Inc.) as used in Example 2 was coated onto the coating to a thickness of about 8 $\mu$m on a dry basis, followed by electron beam irradiation under conditions of acceleration voltage 175 kV and exposure 10 Mrad to perform curing.

Separately, in order to form a hardcoat 2, an ionizing radiation-curable resin containing ultrafine particles as used in Example 2 (KZ 7678, manufactured by JSR) was coated onto a 188 $\mu$m-thick easy-adhesion type PET film [U-42 (tradename), manufactured by Toray Industries, Inc.] as a transparent substrate to a thickness of about 6 $\mu$m on a dry basis. The film provided with the fine particle layer of $ZrO_2$ and the hardcoat 2' as the surface layer was then laminated onto the coated PET film prepared just above in such a manner that the coated surface faced the hardcoat 2'.

Thereafter, electron beam irradiation was carried out under conditions of acceleration voltage of 175 kV and exposure 10 Mrad to cure the coating to form a hardcoat 2. The 50 μm-thick PET film as the outermost surface of the assembly was removed from the cured assembly. Thus, a hardcoat film provided with an antireflection layer having a single layer structure of the fine particles of $ZrO_2$ was prepared. Further, 105 nm-thick ITO and 85 nm-thick $SiO_2$ were sputtered thereon to form a laminated antireflection layer. Thus, an antireflection film of the present invention was prepared.

Comparative Example 1

A 188 μm-thick easy-adhesion type PET film [U-42 (tradename), manufactured by Toray Industries, Inc.] was provided as a transparent substrate. An ionizing radiation-curable resin (EH 65, manufactured by The Inctec Inc.) was coated onto the transparent substrate to a thickness of about 6 μm on a dry basis. The coating was cured by electron beam irradiation under conditions of acceleration voltage 175 kV and exposure 10 Mrad. Thus, a hardcoat film of Comparative Example 1 was prepared.

Comparative Example 2

A hardcoat film of Comparative Example 2 was prepared in the same manner as in Comparative Example 1, except that the thickness of the hardcoat was changed to about 14 μm on a dry basis.

Comparative Example 3

A hardcoat film of Comparative Example 3 was prepared in the same manner as in Comparative Example 1, except that the thickness of the hardcoat was changed to about 20 μm on a dry basis.

Comparative Example 4

A 188 μm-thick easy-adhesion type PET film [U-42 (tradename), manufactured by Toray Industries, Inc.] was provided as a transparent substrate. An ionizing radiation-curable resin containing about 40% by mass of surface-treated ultrafine particles of silica having a diameter of 10 to 50 nm (KZ 7978, manufactured by JSR) was then coated onto the transparent substrate to a thickness of about 6 μm on a dry basis. The coating was then cured by electron beam irradiation under conditions of acceleration voltage of 175 kV and exposure 10 Mrad. Thus, a hardcoat film of Comparative Example 4 was prepared.

Comparative Example 5

A hardcoat film of Comparative Example 5 was prepared in the same manner as in Comparative Example 4, except that the thickness of the hardcoat was changed to about 14 μm on a dry basis.

Comparative Example 6

A 188 μm-thick easy-adhesion type PET film [U-42 (tradename), manufactured by Toray Industries, Inc.] was provided as a transparent substrate. An ionizing radiation-curable resin (EH 65, manufactured by The Inctec Inc.) was then coated onto the transparent substrate to a thickness of about 8 μm on a dry basis. The coating was then irradiated with ultraviolet light at 120 mJ/cm² emitted from Fusion H Bulb to cure the coating, thereby forming a hardcoat 2.

Next, an ionizing radiation-curable resin containing about 40% by mass of surface-treated ultrafine particles of silica having a diameter of 10 to 50 nm (KZ 7978, manufactured by JSR) was then coated onto the hardcoat 2 to a thickness of about 6 μm on a dry basis. The coating was then cured by electron beam irradiation under conditions of acceleration voltage of 175 kV and exposure 10 Mrad to form a hardcoat 2'. Thus, a hardcoat film of Comparative Example 6 was prepared.

Comparative Example 7

27 nm-thick ITO, 24 nm-thick $SiO_2$, 75 nm-thick ITO, and 92 nm-thick $SiO_2$ were sputtered onto the hardcoat 2' in the hardcoat film prepared in Comparative Example 6 to form an antireflection layer. Thus, an antireflection film of Comparative Example 7 was prepared.

Figure 5A:
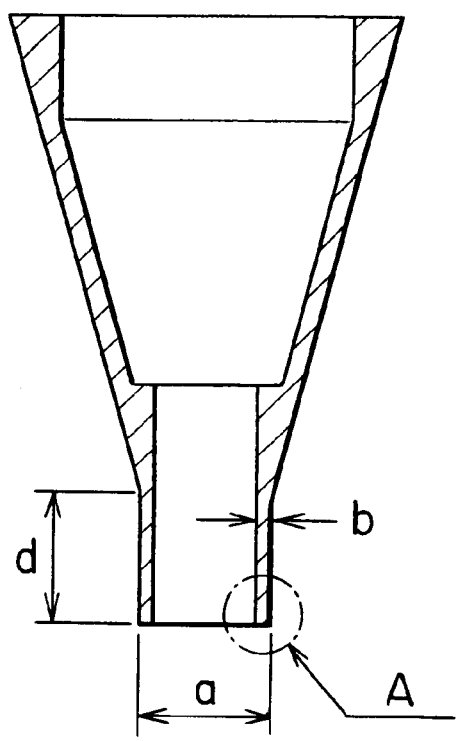
FIG. 5A is a cross-sectional view of the tip of a mechanical pencil used in the measurement of scratch hardness and FIG. 5B a partially enlarged view of portion A in FIG. 5A.
Figure 5B:
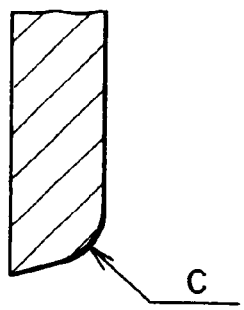

The hardcoat films or the hardcoats prepared in the examples and the comparative examples were measured on the following items. The results are shown in Table 1 below.
Measurement of Modulus of Elasticity A resin film (for example, a 188 μm-thick PET film) with a hardcoat formed thereon was fixed onto a glass plate with the aid of an adhesive. A diamond indenter (angle between opposed faces at the tip of a quadrangular pyramid: 136 degrees) load was gradually applied from the surface of the hardcoat, and the modulus of elasticity (unit: mN/μm) was determined from the load which caused an indentation depth of 1 μm as the modulus of elasticity of the hardcoat. In actual measurement, the modulus of elasticity was determined for each of the hardcoat as the surface layer, the hardcoat located closest to the substrate, and the hardcoat film.
Measurement of Pencil Hardness The pencil hardness was measured according to JIS K 5400. In the pencil hardness test, scratching of a hardcoat film was repeated five times for each of pencils having different hardnesses to determine the maximum hardness of the pencil which, in twice or more out of the five times, did not cause any abnormal phenomenon in the appearance, such as a scratch. For example, when any abnormal phenomenon did not occur in the appearance of the hardcoat film twice or more out of the five times in the repetition of the scratching operations using a pencil of 4H and when an abnormal phenomenon occurred in the appearance of the hardcoat film twice or more out of the five times in the repetition of the scratching operations using a pencil having a hardness of more than 4H, the pencil hardness of the hardcoat film is regarded as 4H.
Measurement of Scratch Hardness The tip of a mechanical pencil as shown in FIGS. 5A and 5B, of which the specifications were as described below, was inclined at 45 degrees to bring the tip in its curved surface (c) into contact with the film to be measured, and, in this state, the pencil was moved at a speed of 6.35 mm/sec while applying a load to scratch the surface of the hardcoat film. The load was changed in 10 g increments. In this case, the hardcoat film was visually inspected for an abnormal phenomenon in the appearance. The maximum load value, which did not cause any abnormal phenomenon in the appearance, was regarded as the scratch hardness of the hardcoat film. The specifications of the mechanical pencil shown in FIGS. 5A and 5B are as follows.

Model: Pentel Co., Ltd. PD-355 or equivalents thereof

Tip diameter of chip: a=0.9±0.06 mm

Chip wall thickness: b=0.2 mm

Chip tip R: c≦0.15 mm

Chip length: d≦3.0 mm

Chip hardness: 200±20 Hv

Measurement of Curling

A hardcoat film of size A4 was placed so as to intimately contact the installation surface with the hardcoat surface facing upward, and in this state, was allowed to stand in an environment of 23±2° C. and 50±5% RH for 24 hr. Thereafter, the height of lifting of four corners of the hardcoat film from the installation surface was measured, and curling was evaluated based on the maximum value of lifting. Specifically, when the maximum value was less than 15 mm, the curling was evaluated as ○; when the maximum value was 15 to 30 mm, the curling was evaluated as Δ; and when the maximum value exceeded 30 mm, the curling was evaluated as ×.

Evaluation of Adhesion

A cross hatch (1.5 mm square) test was carried out twice on the hardcoat film, and the number of hatches of the hardcoat remaining unremoved from the substrate were counted.

TABLE 1

|  | Example | | | | | Comparative Example | | | | | | |
| --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 |
| Modulus of elasticity σS of HC as surface layer, mN/μm | 7.4 | 7.4 | 8.0 | 7.4 | 7.4 | 7.3 | 7.8 | 7.9 | 9.7 | 11.3 | 9.7 | 9.7 |
| Modulus of elasticity σm of HC located closest to transparent substrate, mN/μm | 8.8 | 9.7 | 9.7 | 9.7 | 9.7 | — | — | — | — | — | 7.4 | 7.4 |
| Modulus of elasticity σh of HC film, mN/μm | 7.8 | 8.0 | 8.1 | 8.0 | 8.0 | 7.3 | 7.8 | 7.8 | 9.7 | 11.3 | 10.2 | 10.2 |
| Pencil hardness | 4H | 4H | 5H | 4H | 4H | 3H | 4H | 4H | 3H | 4H | 4H | 4H |
| Scratch hardness, g | 220 | 240 | 260 | 240 | 240 | 140 | 180 | 200 | 140 | 120 | 140 | 120 |
| Curling | ○ | ○ | ○ | ○ | ○ | Δ | Δ | X | Δ | Δ | Δ | Δ |
| Adhesion of coating | 100 | 100 | 90 | 100 | 100 | 100 | 100 | 50 | 100 | 100 | 100 | 100 |

Remarks: "HC" represents "hardcoat."

According to the present invention, a multi-layer hardcoat comprising two or more hardcoats is provided on a transparent substrate to constitute a hardcoat film. In this case, the modulus of elasticity of a hardcoat provided closest to the transparent substrate is made higher than the modulus of elasticity of a hardcoat as a surface layer. By virtue of this construction, a hardcoat film can be realized which, unlike the prior art techniques, even when the total thickness of the hardcoats constituting the multi-layer hardcoat is as large as 10 to 50 μm, can prevent cracking or separation of the hardcoat and curling of the hardcoat film and, at the same time, has excellent hardness properties, that is, a pencil hardness of 4H or more and a scratch hardness of not less than 150 g.

What is claimed is:

1. A hardcoat film comprising: a transparent substrate; and a multi-layer hardcoat structure of two or more layers provided on at least one side of the transparent substrate, the modulus of elasticity σm of a hardcoat provided closest to the transparent substrate being not less than 8 mN/μm and not more than 13 mN/μm, the modulus of elasticity σs of a hardcoat provided as a surface layer being not less than 6 mN/μm and not more than 9 mN/μm, and the modulus of elasticity σm being higher than the modulus of elasticity σs.

2. The hardcoat film according to claim 1, wherein the modulus of elasticity σm of the hardcoat provided closest to the transparent substrate and the modulus of elasticity σs of the hardcoat provided as the surface layer satisfy a requirement represented by formula 3>σm−σs>0.

3. The hardcoat film according to claim 1, wherein the modulus of elasticity σh of the hardcoat film and the modulus of elasticity σs of the hardcoat provided as the surface layer satisfy requirement represented by formula 2≧σh−σs≧0.

4. The hardcoat film according to claim 1, which has a surface hardness of 4H or higher in terms of pencil hardness and a scratch hardness of not less than 150 g.

5. The hardcoat film according to claim 1, wherein at least the hardcoat provided closest to the transparent substrate contains 20 to 80% by mass of inorganic fine particles.

6. The hardcoat film according to claim 1, wherein (1) both the hardcoat provided closest to the transparent substrate and the hardcoat provided as a surface layer contain inorganic fine particles and (2) the content of the inorganic fine particles in the hardcoat provided closest to the transparent substrate is higher than the content of the inorganic fine particles in the hardcoat as the surface layer.

7. The hardcoat film according to claim 5, wherein the inorganic fine particles are ultrafine particles of silica having a particle diameter of not more than 100 nm.

8. The hardcoat film according to claim 1, wherein the multi-layer hardcoat layer has been formed from a material composed mainly of an ionizing radiation-curable resin.

9. The hardcoat film according to claim 1, wherein the total thickness of the hardcoats is 10 to 50 μm.

10. The hardcoat film according to claim 1, wherein the transparent substrate has a surface hardness of not more than HB in terms of pencil hardness.

11. The hardcoat film according to claim 1, wherein the transparent substrate is a polyethylene terephthalate film having a thickness of 100 to 300 μm.

12. An antireflection film comprising an antireflection layer provided on the multi-layer hardcoat in the hardcoat film according to claim 1.

13. The antireflection film according to claim 12, wherein the antireflection layer has a multi-layer structure of two or more layers formed by sputtering or vapor deposition.

14. The antireflection film according to claim 13, wherein the antireflection layer in contact with the multi-layer hardcoat layer is formed of ultrafine particles of a metal oxide.

* * * * *